(12) United States Patent
Yonemura et al.

(10) Patent No.: US 6,274,638 B1
(45) Date of Patent: Aug. 14, 2001

(54) METHOD FOR PRODUCTION OF POROUS CROSS-LINKED POLYMER MATERIAL

(75) Inventors: Koichi Yonemura, Suita; Hiroshi Yamazaki, Sakai; Masazumi Sasabe, Kakogawa; Hirotama Fujimaru, Suita; Kinya Nagasuna, Kitakatsuragi-gun, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/712,557

(22) Filed: Nov. 14, 2000

(30) Foreign Application Priority Data

Nov. 19, 1999 (JP) .................................................. 11-329349

(51) Int. Cl.$^7$ ...................................................... C08J 9/28
(52) U.S. Cl. ................................................ 521/64; 521/65
(58) Field of Search .................................................. 521/64

(56) References Cited

U.S. PATENT DOCUMENTS

| | | | |
|---|---|---|---|
| 4,522,953 | 6/1985 | Barby et al. | 521/64 |
| 4,739,008 | 4/1988 | Robinson et al. | 524/801 |
| 5,189,070 | 2/1993 | Brownscombe et al. | 521/64 |
| 5,290,820 | 3/1994 | Brownscombe et al. | 521/64 |

FOREIGN PATENT DOCUMENTS

| | | | |
|---|---|---|---|
| 15 69 541 A | 4/1970 | (DE) | C08J/1/32 |
| WO 92/16565 | 10/1992 | (WO) | C08F/2/18 |
| WO 93/24535 | 12/1993 | (WO) | C08F/2/32 |
| WO 97/27240 | 7/1997 | (WO) | C08J/9/28 |

*Primary Examiner*—Morton Foelak
(74) *Attorney, Agent, or Firm*—Fish & Richardson P.C.

(57) ABSTRACT

This invention is targeted at providing a method for producing a porous cross-linked polymer material excelling in absorption properties and mechanical strength in a short period of time. In the production of a porous cross-linked polymer material from an HIPE, the method of this invention is characterized by comprising a step of polymerizing the HIPE till the bromine value thereof falls to not more than 25% of the value existing prior to the polymerization and a subsequent step of after curing the porous cross-linked polymer material by means of an active energy ray or a temperature higher than the polymerization temperature.

10 Claims, 1 Drawing Sheet

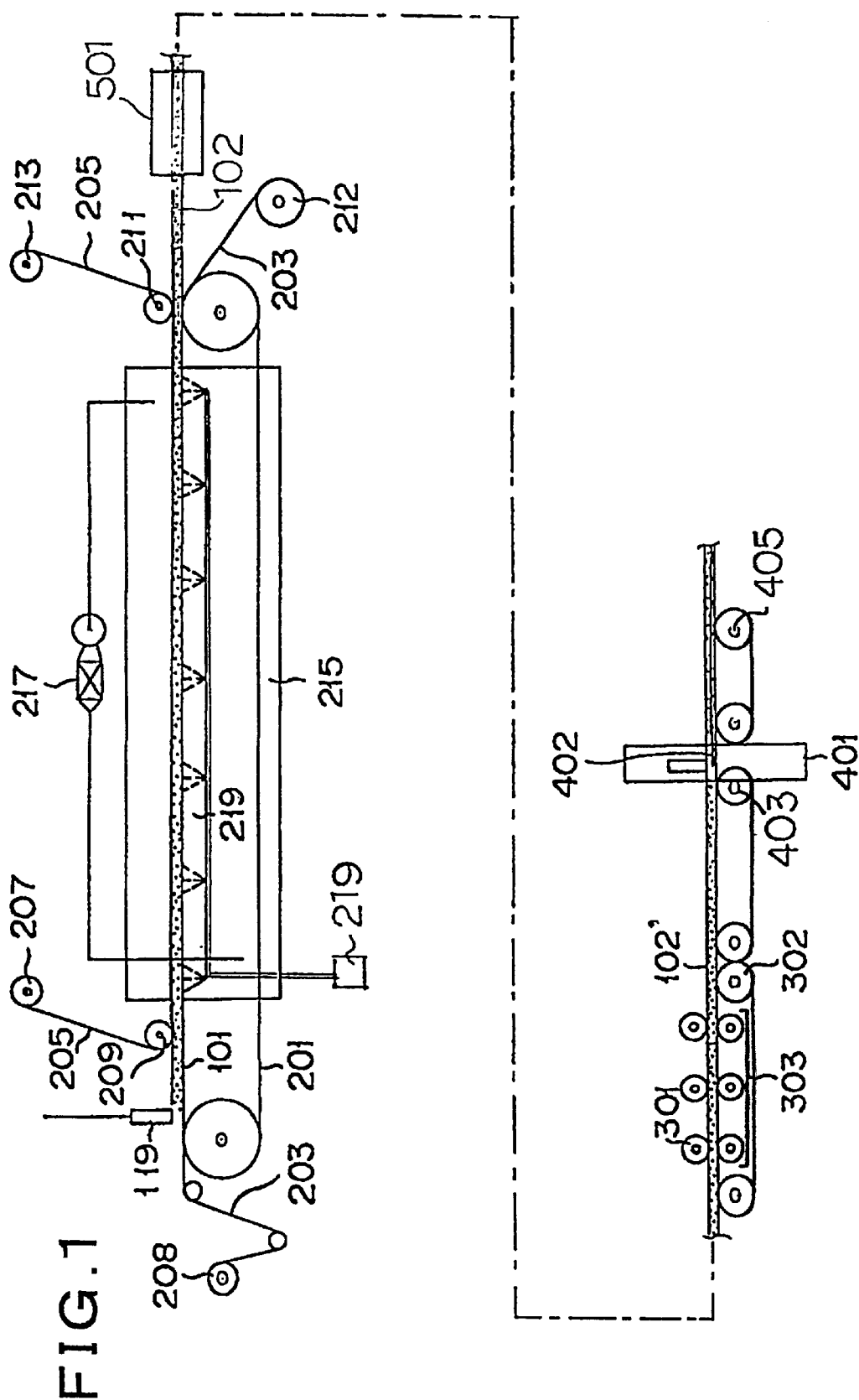

METHOD FOR PRODUCTION OF POROUS CROSS-LINKED POLYMER MATERIAL

BACKGROUND OF THE INVENTION

1. Field of the Invention

This invention relates to a method for the production of a porous cross-linked polymer which comprises a step of polymerizing a water-in-oil type high internal phase emulsion (hereinafter referred to briefly as "HIPE") and a step of after curing the HIPE in a very short period of time thereby producing a porous cross-linked polymer having continuous cells having communicating pores formed in the surface and the interior thereof (hereinafter referred to also as "open cells"). More particularly, this invention relates to a method for the production of a porous cross-linked polymer which can be widely applied to (1) liquid absorbent materials such as, for example, ① core materials in disposable diapers to be used for absorbing body fluid such as urine and blood; and ② absorbing materials of water, oil and organic solvent to be used for disposing of a waste oil a waste solvent and waste organic solvents; (2) energy absorbent materials such as, for example, sound insulating materials and heat insulators in automobiles and buildings to be used for absorbing sound and heat; and (3) chemical impregnating substrates such as, for example, products of domestic use impregnated with an aromatic agent, a detergent, a lustering agent, a surface protecting agent, and a flame-retarding agent.

2. Background Art

The term "HIPE" refers to an emulsion wherein the ratio of a water phase, i.e. a dispersed phase (inner phase), to an oil phase, i.e. an outer phase is not less than about 3/1. It is known to produce a porous cross-linked polymer material by polymerizing this HIPE. The porous cross-linked polymer material produced by using a foaming agent without preparing an HIPE (hereinafter occasionally referred to simply as "foam") is disposed to afford a foam of closed cells of a comparatively large diameter. In contrast, the method for producing a porous cross-linked polymer material from an HIPE (hereinafter occasionally referred to briefly as "HIPE method") excels in capability of producing a low-density foam of open cells having a minute diameter. Methods for producing porous cross-linked polymer materials from HIPE's are disclosed in the official gazette of U.S. Pat. No. 4,522,953, WO93/24,535 and U.S. Pat. No. 5,290,820, for example.

The official gazette of U.S. Pat. No. 4,522,953 discloses a method which comprises preparing an HIPE containing a water-soluble and/or an oil-soluble polymerization initiator and thermally polymerizing this HIPE at 50° C. or 60° C. for eight hours to 72 hours. The official gazette of WO93/24,535 discloses a method which produces a sheet-like porous cross-linked polymer material by placing an HIPE in a bag of film, reeling up the bag containing the HIPE, and causing the HIPE to cure as held in the bag and the official gazette of WO93/24,535 discloses a method which comprises forming a gel possessed of a prescribed dynamic modulus of elasticity in shear from an emulsion at a temperature of less than 65° C. and thereafter polymerizing the gel at a temperature of not less than 70° C. The invention of the official gazette of WO93/24,535 requires to form the gel because the emulsion is unstable at high temperatures and the formation of the gel enables the emulsion to acquire strength enough for the gel to be polymerized at the subsequent step. Further, for the purpose of obtaining a porous cross-linked polymer material in a short period of time, this invention contemplates incorporating in the emulsion a polymerization catalyst in an amount in the range of 0.005–15 wt % based on the weight of a polymerizable monomer and precuring the emulsion to effect the formation of a gel.

The methods disclosed in the official gazette of U.S. Pat. No. 4,522,953 and WO93/24,535, however, are deficient in efficiency of production because they entail unduly long periods of polymerization time. The invention of the official gazette of WO93/24,535 is claimed to attain the polymerization in a comparatively short period of time by a method comprising the steps of forming a gal possessed of a prescribed dynamic modulus of elasticity in shear from an emulsion at a temperature of less than 65° C. and thereafter polymerizing the gel at a temperature of not less than 70° C. The method, nevertheless, requires roughly several hours as the time of polymerization.

Generally, for the purpose of shortening the time of polymerization, such methods as increasing the amount of a polymerization initiator and promoting the decomposition of the initiator prove effective. The velocity of polymerization and the molecular weight of a polymer are, however, in inverse proportion. The reduction in the polymerization time entails a decline of the molecular weight of a polymer contained in the HIPE and this decline frequently results in degrading the qualities such as absorption properties and mechanical strength. In the production of a porous cross-linked polymer material, particularly an attempt to complete the polymerization in such a short span of time as within one hour brings a prominent degradation in performance. It is an object of this invention, therefore, to solve the technical problems of the prior art mentioned above and provide a method for the production of a porous cross-linked polymer material which effects polymerization of an HIPE in an exceptionally short period of time without impairing the stability of the HIPE.

SUMMARY OF THE INVENTION

The present inventor has made a diligent study in search of a method for producing a porous cross-linked polymer material in a very short period of time by the HIPE technique and has consequently discovered that when an HIPE is polymerized till the bromine value thereof falls below 25% of the value existing prior to the polymerization and then irradiated with an active energy ray or aftercured at a temperature higher than the polymerization temperature so as to promote the cross-linking already in process, the porous cross-linked polymer material possessed of fully satisfactory mechanical strength and excelling in absorption properties can be obtained in a short period of time. This invention has been perfected as a result.

To be specific, the objects of this invention are accomplished by the following item (1).

1. In the production of a porous cross-linked polymer material by the polymerization of a water-in-oil emulsion, a method for the production of a porous cross-linked polymer material, comprising a step of polymerizing said water-in-oil emulsion till the bromine value thereof falls to not more than 25% of the value existing prior to said polymerization and a subsequent step of after curing the produced porous cross-linked polymer material by virtue of an active energy ray or a temperature higher than the polymerization temperature.

According to this invention, a porous cross-linked polymer material can be aftercured in such a heretofore hardly predictable unusually short period of time as not more than one hour, preferably not more than 30 minutes so as to permit highly efficient production of a porous cross-linked polymer material excelling in absorption properties and mechanical strength.

BRIEF DESCRIPTION OF THE DRAWINGS

FIG. 1 is a flow diagram representing a typical mode of embodiment of a porous cross-linked polymer material using an apparatus for continuous polymerization which is one of the preferred apparatuses for polymerization in the method for production of a porous cross-linked polymer material contemplated by this invention.

DETAIL DESCRIPTION OF THE INVENTION

This invention relates, in the production of a porous cross-linked polymer material by the polymerization of an HIPE, to a method for the production of a porous cross-linked polymer material which comprises polymerizing an HIPE till the bromine value thereof falls to not more than 25% of the value existing prior to the polymerization and subsequently after curing the resultant the produced porous cross-linked polymer material by virtue of an active energy ray or to a temperature higher than the polymerization temperature.

The present inventor, after having studied in detail the process for producing a porous cross-linked polymer material by the polymerization of an HIPE, have discovered that the polymerization of the HIPE consists of two stages, i.e. a stage of polymerization of a polymerizing monomer forming the skeleton of a porous cross-linked polymer material and a subsequent stage of polymerization with a cross-linking agent for the formation of a three-dimensional cross-link and that particularly when the latter polymerization (hereinafter referred to as "after curing") is performed under the polymerization condition using a higher energy than the former polymerization, the HIPE can be polymerized in a short period of time without impairing the stability of the HIPE and the produced porous cross-linked polymer material manifests an improved performance in mechanical strength and absorption. It has been further ascertained to the present inventor that the polymerization of the former stage can be completed in such a short period of time as within one hour by selecting the kind of polymerization initiator and the temperature of polymerization and equalizing the amount of the initiator to be decomposed within a prescribed polymerization time (within one hour), namely the amount of radical to be generated therein, with the amount of the monomer to be substantially eliminated. Furthermore, it has been found that the demarcation between the polymerization of the former stage and the after curing falls at the time at which the bromine value of a given HIPE falls to not more than 25% of the value existing prior to the polymerization. The expression "bromine value of a water-in-oil emulsion" as used in this invention is to be determined by the method which is described in the paragraph regarding the measurement of bromine value in a working example cited herein below. By regarding the time at which the bromine value of a given HIPE falls to not more than 25% of the value existing prior to the polymerization as "the time for completing the polymerization of a polymerizing monomer in the HIPE" and then treating the produced porous cross-linked polymer material under the polymerization condition of a higher energy than in the polymerization of the former stage according to the present invention, it is made possible to obtain a porous cross-linked polymer material excelling in such characteristic properties as mechanical properties and absorption in such a short period of time as, for example, in the range of 30 minutes to one hour.

Now, one example of the mode of continuously producing a porous cross-linked polymer by polymerizing an HIPE will be described below with reference to the process flow illustrated in FIG. 1. As illustrated in FIG. 1, an HIPE 101 is continuously supplied from an HIPE supplying part 119 onto a sheet material 203 and formed in the shape of a sheet of a prescribed thickness by adjusting the set height of a roller 209. An unwinding roller 208 and a rewinding roller 212 have their rotational speeds adjusted so that the sheet material 203 may be synchronized with a conveyor belt 201. The sheet material 205 held under such tension as to impart a fixed thickness to the HIPE 101 is advanced at a rotational speed which is controlled by rollers 209 and 211 and an unwinding roller 207 and a rewinding roller 213. Inside a polymerizing oven 215, the HIPE 101 is polymerized by a heating means 219 formed of a hot water shower and disposed under the conveyor belt 201 and a hot air circulating device disposed above the conveyor belt 201 to afford a porous cross-linked polymer 102. The porous cross-linked polymer 102 is stripped of the upper and lower sheet materials 203 and 205, then, the porous cross-linked polymer 102 is aftercured by being irradiated with an active electron beam emitted from an active energy ray irradiation device 501. The aftercured porous cross-linked polymer 102' is mounted on a belt rotated by a conveyor 302 operated by the rolls of a dehydrating device 303. It is nipped between pressing rolls 301 opposed vertically to each other across the belt and dehydrated by virtue of the rotation of the rolls 303. Optionally, the dehydrated porous cross-linked polymer 102' is transferred to a continuously disposed endless band knife type slicer 401 and is sliced in the direction of thickness by a band knife 402 kept in rotation.

Now, the component steps of the method for production according to this invention will be described in detail below in the order of their occurrence.

[1] Preparation of HIPE
(1) Raw Materials Used for HIPE

The raw materials to be used for an HIPE are only required to include (a) a polymerizing monomer, (b) a cross-linking monomer, and (c) a surfactant as essential components for forming an oil phase and (d) water as an essential component for a water phase. They may optionally include further (e) a polymerization initiator, (f) a salt, and (g) other additive as arbitrary components for forming an oil phase and/or a water phase.

(a) Polymerizing monomer

The monomer composition essential for the composition of the HIPE mentioned above is a polymerizing monomer possessing one polymerizing unsaturated group in the molecule thereof. Though it does not need to be particularly discriminated but has only to be capable of being polymerized in a dispersion or a water-in-oil type high internal phase emulsion and allowed to form an emulsion consequently. It preferably contains a (meth)acrylic ester at least partly, more preferably contains not less than 20 mass % of the (meth) acrylic ester, and particularly preferably contains not less than 35 mass % of the (meth)acrylic ester. When the (meth)acrylic ester is contained as a polymerizing monomer possessing one polymerizing unsaturated group in the molecule thereof proves advantageous because the produced porous cross-linked polymer abounds in flexibility and toughness.

As concrete examples of the polymerizable monomer which is used effectively in this invention, alkylene monomers such as styrene; monoalkylene alkylene monomers such as ethyl styrene, α-methyl styrene, vinyl toluene, and vinyl ethyl benzene; (meth)acrylic esters such as methyl (meth)acrylate, ethyl (meth)acrylate, butyl (meth)acrylate, isobutyl (meth)acrylate, isodecyl (meth)acrylate, 2-ethylhexyl (meth)acrylate, lauryl (meth)acrylate, stearyl (meth)acrylate, cyclohexyl (meth)acrylate, and benzyl (meth)acrylate; chlorine-containing monomers such as vinyl chloride, vinylidene chloride, and chloromethyl styrene; acrylonitrile compounds such as acrylonitrile and methacrylonitrile; and vinyl acetate, vinyl propionate, N-octadecyl acrylamide, ethylene, propylene, and butene may be cited. These polymerizable monomers may be used either singly or in the form of a combination of two or more members.

The content of the polymerizing monomer is preferred to be in the range of 10–99.9 mass %, based on the total mass of the monomer composition consisting of the polymerizing monomer and a cross-linking monomer. The reason for this range is that the produced porous cross-lined polymer is enabled to acquire pores of minute diameters. The range is more preferably 30–99 mass % and particularly preferably 30–70 mass %. If the content of the polymerizing monomer is less than 10 mass %, the produced porous cross-linked polymer will be possibly friable and deficient in water absorption ratio. Conversely, if the content of the polymerizing monomer exceeds 99.9 mass %, the porous cross-linked polymer consequently produced will be possibly deficient in strength and elastic recovery power and incapable of securing sufficient amount of water absorbed and sufficient velocity of water absorption.

(b) Cross-linking monomer The other monomer composition essential for the composition of the HIPE mentioned above is a cross-linking monomer possessing at least two polymerizing unsaturated groups in the molecule thereof. Similarly to the polymerizing monomer mentioned above, it does not need to be particularly discriminated but has only to be capable of being polymerized in a dispersion or a water-in-oil type high internal phase emulsion and allowed to form an emulsion consequently.

As concrete examples of the cross-linking monomer which is effectively usable herein, aromatic monomers such as divinyl benzene, trivinyl benzene, divinyl toluene, divinyl xylene, p-ethyl-vinyl benzene, divinyl naphthalene, divinyl alkyl benzenes, divinyl phenanthrene, divinyl biphenyl, divinyl diphenyl methane, divinyl benzyl, divinyl phenyl ether, and divinyl diphenyl sulfide; oxygen-containing monomers such as divinyl furan; sulfur-containing monomers such as divinyl sulfide and divinyl sulfone; aliphatic monomers such as butadiene, isoprene, and pentadiene; and esters of polyhydric alcohols with acrylic acid ormethacrylic acid such as ethylene glycol di(meth)acrylate, diethylene glycol di(meth)acrylate, triethylene glycol di(meth)acrylate, polyethylene glycol di(meth)acrylate, 1,3-butane diol di(meth)acrylate, 1,4-butane diol di(meth)acrylate, 1,6-hexane diol di(meth)acrylate, octane diol di(meth)acrylate, decane diol di(meth)acrylate, trimethylol propane di(meth)acrylate, trimethylol propane tri(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra(meth)acrylate, N,N'-methylene bis (meth)acryl amide, triallyl isocyanurate, triallyl amine, tetraallyloxy ethane, hydroquinone, catechol, resorcinol, and sorbitol may be cited. These cross-linking monomers may be used either singly or in the form of a combination of two or more members.

The content of the cross-linked monomer is properly in the range of 0.1–90 mass %, preferably 1–70 mass %, and particularly preferably 30–70 mass %, based on the total mass of themonomer composition consisting of the polymerizing monomer mentioned above and the cross-linking monomer mentioned above. If the content of the cross-linked monomer is less than 0.1 mass %, the produced porous cross-linked polymer will possibly be deficient in strength and elastic recovery force, unable to effect absorption sufficiently per unit volume or unit mass, and incapable of securing absorption in a sufficient amount at a sufficient velocity. Conversely, if the content of the cross-linked monomer exceeds 90 mass %, the porous cross-linked polymer produced consequently will possibly be friable and deficient in water absorption ratio.

(c) Surfactant

The surfactant which is essential for the composition of the HIPE mentioned above does not need to be particularly discriminated but has only to be capable of emulsify a water phase in an oil phase forming the HIPE. It is not limited to the specific examples cited above but may be selected from the nonionic surfactants, cationic surfactants, amphoteric surfactants and ampholytic surfactants heretofore known to the art.

Among these surfactants, as concrete examples of the nonionic surfactant, nonyl phenol polyethylene oxide adduct; block polymer of ethylene oxide and propylene oxide; sorbitan fatty acid esters such as sorbitan monolaurate, sorbitan monomyristylate, sorbitan monopalmitate, sorbitan monostearate, sorbitan tristearate, sorbitan monooleate, sorbitan trioleate, sorbitan sesquioleate, and sorbitan distearate; glycerin fatty acid esters such as glycerol monostearate, glycerol monooleate, diglycerol monooleate, and self-emulsifying glycerol monostearate; polyoxyethylene alkyl ethers such as polyoxyethylene lauryl ether, polyoxyethylene cetyl ether, polyoxyethylene stearyl ether, polyoxyethylene oleyl ether, and polyoxyethylene higher alcohol ethers; polyoxyethylene alkylaryl ethers such as polyoxyethylene nonyl phenyl ether; polyoxyethylene sorbitan fatty acid esters such as polyoxyethylene sorbitan monolaurate, polyoxyethylene sorbitan monomyristylate, polyoxyethylene sorbitan monopalmitate, polyoxyethylene sorbitan monostearate, polyoxyethylene sorbitan tristearate, polyoxyethylene sorbitan monooleate, and polyoxyethylene sorbitan trioleate; polyoxyethylene sorbitol fatty acid esters such as tetraoleic acid polyoxyethylene sorbit; polyoxyethylene fatty acid esters such as polyethylene glycol monolaurate, polyethylene glycol monostearate, polyethylene glycol distearate, and polyethylene glycol monooleate; polyoxyethylene alkyl amines; hydrogenated polyoxyethylene castor oil; and alkyl alkanol amides may be cited. These nonionic surfactants having HLB values of not more than 10, more preferably in the range of 2–6, prove preferable. It is permissible to use two or more such nonionic surfactants in combination. The combined use possibly results in stabilizing the HIPE.

As concrete examples of the cationic surfactant, quaternary ammonium salts such as stearyl trimethyl ammonium chloride, ditallow dimethyl ammonium methyl sulfate, cetyl trimethyl ammonium chloride, distearyl dimethyl ammonium chloride, and alkylbenzyl dimethyl ammonium chloride; alkyl amine salts such as coconut amine acetate and stearyl amine acetate; alkyl betaines such as lauryl trimethyl ammonium chloride, lauryl betaine, stearyl betaine, and lauryl carboxymethyl hydroxyethyl imidazolinium betaine; and amine oxides such as lauryl dimethyl amine oxide may be cited. The use of the cationic surfactant can impart excellent antibacterial properties to the porous cross-linked polymer when the polymer is used for an absorbent material, for example.

The combined use of the nonionic surfactant and the cationic surfactant may possibly improve the HIPE in stability.

The content of the surfactant mentioned above is properly in the range of 1–30 mass parts, preferably 3–15 mass parts, based on 100 mass parts of the total mass of the monomer composition consisting of the polymerizing monomer and the cross-linked monomer. If the content of the surfactant is less than 1 mass part, the shortage will possibly deprive of the HIPE of stability of dispersion and prevent the surfactant from manifesting the effect inherent therein sufficiently. Conversely, if the content of the surfactant exceeds 30 mass parts, the excess will possibly render the produced porous cross-linked polymer unduly friable and fail to bring a proportionate addition to the effect thereof and do any good economically.

(d) Water

The water essential for the composition of the HIPE mentioned above may be city water, purified water or deionized water. Alternatively, with a view to utilizing to advantage the waste water resulting from the production of the porous cross-linked polymer, this waste water may be adopted in its unmodified form or after undergoing a prescribed treatment.

The content of the water may be suitable selected, depending on the kind of use (such as, for example, an absorbent material, sound insulation material, or filter) for which the porous cross-linked polymer possessing continuous cells is intended. Since the hole ratio of the porous cross-linked polymer material is decided by varying the water phase/oil phase (W/O) ratio of the HIPE, the amount of water to be used is automatically decided by selecting the W/O ratio calculated to produce a hole ratio which conforms to the use and the purpose of the produced material.

(e) Polymerization initiator

For the purpose of accomplishing the polymerization of an HIPE in a very short period of time as aimed at by this invention, it is advantageous to use a polymerization initiator. The polymerization initiator is only required to be suitable for use in the reversed phase emulsion polymerization. It is not discriminated between the water-soluble type and the oil-soluble type.

As concrete examples of the water-soluble polymerization initiator which is used effectively herein, azo compounds such as 2,2'-azobis (2-amidinopropane) dihydrochloride; persulfates such as ammonium persulfate, potassium persulfate, and sodium persulfate; peroxides such as potassium peracetate, sodium peracetate, sodium percarbonate, potassium peracetate may be cited.

As concrete example of the oil-soluble polymerization initiator which is used effectively herein, peroxide such as, cumene hydroperoxide, t-butyl hydroperoxide, t-butylperoxide-2-ethylhexyanoate di-t-butyl peroxide, diisopropyl benzene hydroperoxide, p-methane hydroperoxide, 1,1,3,3-tetramethylbutyl hydroperoxide, 2,5-dimethylhexane-2,5-dihydroperoxide, benzoyl peroxide, and methylethyl ketone peroxide may be cited. These polymerization initiators may be used either singly or in the form of a combination of two or more members.

Combined use of two or more kinds of polymerization initiator having different 10 hour half period temperatures, i.e. the temperatures at which the concentrations of the relevant initiators are halved in 10 hours proves advantageous. As a matter of course, it is permissible to use in combination the water-soluble polymerization initiator and the oil-soluble polymerization initiator.

The content of the polymerization initiator mentioned above is properly in the range of 0.05–25 mass parts, preferably 1.0–10 mass parts, based on 100 mass parts of the total mass of the monomer composition consisting of a polymerizing monomer and a cross-linking monomer, though it is variable with the combination of the polymer composition and the polymerization initiator. If the content of the polymerization initiator is less than 0.05 mass part, the shortage will be at a disadvantage in increasing the amount of the unaltered monomer component and consequently increasing the residual monomer content in the produced porous cross-linked polymer. Conversely, if the content of the polymerization initiator exceeds 25 mass parts, the excess will be at a disadvantage in rendering the polymerization difficult to control and degrading the mechanical property of the produced porous cross-linked polymer.

The amount of the polymerization initiator to be added, for the purpose of shortening the polymerization time particularly in the polymerization of the former stage and preventing the occurrence of a polymerizing polymer of a low molecular weight as well, is preferred to be so set as to ensure generation of an amount of radical sufficient for completing the polymerization of the HIPE in the former stage within the prescribed polymerization time. The polymerization initiator relies on its own decomposition to manifest the performance thereof. If the decomposition is not sufficient, it will be no longer possible to obtain a high molecular polymer possessed of excellent properties without reference to the amount of the polymerization initiator to be added.

To be more specific, in order for the polymerization to advance within one hour till the bromine value of an HIPE falls to not more than 25% of the value existing prior to the polymerization, the amount of the polymerization initiator to complete decomposition within the polymerization time is properly in the range of 0.05–5.0 mol %, preferably 1–3 mol %, based on the monomer component. It is provided, however, that when the number of radicals, n, which are generated in consequence of the decomposition of the polymerization initiator satisfies n>2, the amount of the polymerization initiator is preferred to be set in a range which is n/2 times the range mentioned above. This value represents the amount of the polymerization initiator which completes decomposition within the polymerization time. So long as this amount is controlled in this range, the total amount of the polymerization initiator to be used does not need to be particularly restricted. If the amount of the polymerization initiator which completes decomposition within the polymerization time is less than 0.05 mol %, the shortage will render it difficult for the polymerization to advance till the prescribed bromine value within the polymerization time.

Alternatively, a redox polymerization initiator formed by combining the polymerization initiator mentioned above with a reducing agent may be used. In this case, the polymerization initiator to be used herein does not need to be discriminated between the water-soluble type and the oil-soluble type. It is permissible to use a water-soluble redox polymerization initiator and an oil-soluble redox polymerization initiator in combination.

In the reducing agents, as concrete examples of the water-soluble reducing agents, sodium hydrogen sulfite, potassium hydrogen sulfite, sodium thiosulfate, potassium thiosulfate, L-ascorbic acid, ferrous salts, formaldehyde sodiumsulfoxylate, glucose, dextrose, triethanol amine, and diathanol amine may be cited. As concrete examples of the oil-soluble reducing agent, dimethyl aniline, tin octylate, and cobalt naphthenate may be cited. These redox polymerization initiator type reducing agents may be used either singly or in the form of a mixture of two or more members.

The ratio of the reducing agent contained in the redox polymerization initiator mentioned above (mass ratio), i.e. the polymerization initiator (oxidizing agent)/reducing agent, is in the approximate range of 1/0.01–1/10, preferably 1/0.2–1/5.

The polymerization initiator (inclusive of the redox polymerization initiator) is only required to be present at least-during the course of the polymerization of an HIPE. It may be added to the oil phase and/or the water phase ① prior to the formation of an HIPE, ② simultaneously with the formation of an HIPE, or ③ after the formation of an HIPE. In the case of the redox polymerization initiator, the polymerization initiator (oxidizing agent) and the reducing agent may be added at different times.

(f) Salt

The salt as an arbitrary component for the composition of the HIPE mentioned above may be used when it is necessary for improving the stability of the HIPE.

As concrete examples of the salt of this nature, halogenides, sulfates, nitrates, and other similar water-soluble salts of alkali metals and alkaline earth metals such as calcium chloride, sodium sulfate, sodium chloride, and magnesium sulfate may be cited. These salts may be used either singly or in the form of a combination of two or more members. Such a salt is preferred to be added in the water phase. Among other salts mentioned above, polyvalent metal salts prove particularly advantageous from the viewpoint of the stability of the HIPE during the course of polymerization.

The content of the salt mentioned above is proper in the range of 0.1–20 mass parts, preferably 0.5–10 mass parts, based on 100 mass parts. If the content of the salt exceeds 20 mass parts, the excess will be at a disadvantage in suffering the waste water squeezed out of the HIPE to contain the water in an unduly large amount, boosting the cost for the disposal of the waste water, failing to bring a proportional addition to the effect, and not doing any good economically. If the content is less than 0.1 mass part, the shortage will possibly prevent the effect of the addition of the salt from being fully manifested.

(g) Other additive

Varying other additive which are capable of improving the conditions of production, the property of HIPE, and the performance of the porous cross-linked polymer by imparting the performance and the function of their own, they may be suitably used herein. For example, a base and/or a buffer may be added for the purpose of adjusting the pH value. The content of the other additive may be selected within such a range that the additive used may fully manifest the performance, function, and further the economy commensurate with the purpose of addition. As such additives, activated carbon, inorganic powder, organic powder, metallic powder, deodorant, antibacterial agent, antifungi agent, perfume and other highly polymerized compounds may be cited.

(2) Method for Preparation of HIPE

The method for production of the HIPE which can be used in this invention does not need to be particularly discriminated. Any of the methods for production of HIPE heretofore known to the art may be suitably used. A typical method for the production of interest will be specifically described below.

First, a polymerizing monomer, a cross-linking monomer, and a surfactant as essential components and further an oil-soluble polymerization initiator (inclusive of an oil-soluble redox polymerization initiator) and other additive as optional components for the formation of an oil phase prepared in respectively specified amounts mentioned above are stirred at a prescribed temperature to produce a homogeneous oil phase.

Meanwhile, water as an essential component and further a water-soluble polymerization initiator (inclusive of a water-soluble redox polymerization initiator), salts, and other additive as optional components for the formation of a water phase prepared in respectively specified amounts are stirred and heated to a prescribed temperature in the range of 30–95° C. to produce a homogeneous water phase.

Then, the oil phase which is the mixture of the monomer component, surfactant, etc. and the water phase which is the mixture of water, water-soluble salt, etc., both prepared as described above are joined, mixed and stirred efficiently for exertion of proper shearing force and induction of emulsification at the temperature for the formation of an HIPE (emulsifying temperature) which will be described specifically hereinbelow to accomplish'stable preparation of an HIPE. As a means for stirring and mixing the water phase and the oil phase particularly for the table preparation of the HIPE, the method which comprises keeping the oil phase stirred and continuously adding the water phase to the stirred oil phase over a period of several minutes to some tens of minutes. Alternatively, the HIPE aimed at may be produced by stirring and mixing part of the water phase component and the oil phase component thereby forming an HIPE resembling yogurt and continuing the stirring and mixing operation while adding the remaining portion of the water phase component to the yogurt-like HIPE.

(3) Water Phase/Oil Phase (W/O) Ratio

The water phase/oil phase (W/O) ratio (mass ratio) of the HIPE which is obtained as described above does not need to be particularly limited but may be properly selected to suit the purpose for which the porous cross-linked polymer material possessed of open cells is used (such as, for example, water absorbent, oil absorbent, sound insulating material, and filter). It is only required to be not less than 3/1 as specified above and is preferred to fall in the range of 10/1–250/1, particularly 10/1–100/1. If the W/O ratio is less than 3/1, the shortage will be possibly at a disadvantage in preventing the porous cross-linked polymer material from manifesting a fully satisfactory ability to absorb water and energy, lowering the degree of opening, and causing the surface of the produced porous cross-linked polymer material to suffer from unduly low degree of opening and fail to exhibit a fully satisfactory permeability to liquid. The hole ratio of the porous cross-linked polymer material is decided by varying the W/O ratio. Thus, the W/O ratio is preferred to be selected so as to impart to the produced porous cross-linked polymer material a hole ratio conforming to the use and the purpose. When the product is used as a varying absorbent material such as disposable diaper or sanitary article, for example, the W/O ratio is preferred to fall in the approximate range of 10/1–100/1. Incidentally, the HIPE which is obtained by stirring and mixing the water phase and the oil phase is generally a white highly viscous emulsion.

(4) Apparatus for Production of HIPE

The apparatus for the production of the HIPE mentioned above does not need to be particularly discriminated. Any of the apparatuses for the production of the porous cross-linked polymer material which have been heretofore known to the art may be used. For example, the stirring device (emulsifier) to be used for mixing and stirring the water phase and the oil phase may be selected from among the stirring devices and the kneading devices which have been heretofore known to the art. As concrete examples of the stirring device, stirring devices using vanes of the propeller type, the paddle type, and the turbine type, homomixers, line mixers, and pin mills may be cited.

(5) Temperature for Forming HIPE

The temperature for forming an HIPE (hereinafter refers to emulsifying temperature) is generally in the range of 20–100° C. From the viewpoint of the stability of the HIPE, the temperature is preferably in the range of 30–95° C., more preferably 40–95° C., particularly preferably 40–85° C., and most preferably 55–70° C. If the temperature for forming the HIPE is less than 20° C., the shortage will possibly result in unduly elongating the time for heating, depending on the temperature of hardening. Conversely, if the temperature exceeds 100° C., the excess will possibly result in degrading the stability of the formed HIPE. Incidentally, it is commendable to adjust preparatorily the temperature of the oil phase and/or the water phase to the prescribed emulsifying temperature and then stir and mix the two phases till emulsification and form the HIPE as expected. Since the preparation of the HIPE uses the water phase in a larger amount, the preparatory adjustment of the temperature of at least the water phase to the prescribed emulsifying temperature may well be rated as more favorable. If the polymerizing monomer or the cross-linking monomer begins to polymerize and forms a polymer while the emulsification is in progress, the formed polymer will possibly impair the stability of the HIPE. When a polymerization initiator (inclusive of a redox polymerization initiator) is incorporated in the raw material for the preparation of the HIPE, therefore, the emulsifying temperature of the HIPE is preferred to be incapable of inducing the polymerization initiator (oxidizing agent) to undergo substantial thermal decomposition enough to initiate polymerization of the HIPE. More preferably, the emulsifying temperature is lower than the temperature at which the half-life of the polymerization initiator (oxidizing agent) is 10 hours (10-hour half-life temperature).

[II] Production of Porous Cross-linked Polymer Material (1) Addition of Polymerization Initiator (a) Time for addition of polymerization initiator This invention contemplates ① adding a polymerization initiator to the water phase and/or the oil phase and mixing them prior to the formation of an HIPE, ② simultaneously adding the polymerization initiator with the formation of the HIPE, or ① making this addition subsequently to the formation of the HIPE. Even in the case of the addition of ②, a redox polymerization initiator may be used similarly in the case of ① described above regarding the method for forming the HIPE.

(b) Method for addition of polymerization initiator

It is convenient to add preparatorily the polymerization initiator to the oil phase when the polymerization initiator or the reducing agent is an oil-soluble type or to the water phase when it is in a water-soluble type. Alternatively, the oil-soluble polymerization initiator (oxidizing agent) or the reducing agent may be added in an emulsified form, for example, to the water phase.

(c) Form of use of polymerization initiator

The polymerization initiator may be used in an undiluted form, in the form of a solution in water or an organic solvent, or in the form of a dispersion. When the addition is made either simultaneously with or subsequently to the formation of the HIPE, it is important that the added polymerization initiator be quickly and homogeneously mixed with the HIPE for the purpose of avoiding the otherwise possible heterogeneous polymerization of the monomer component. Further, the HIPE which has been mixed with the polymerization initiator is quickly introduced into a polymerization vessel or a continuous polymerizing device as means for polymerization. It is commendable from this point of view to insert a path for the introduction of a polymerization initiator such as a reducing agent or an oxidizing agent in the path extending from the emulsifying device for preparing the HIPE through the polymerization vessel or the continuous polymerizing device, adding the polymerization initiator via the path to the HIPE, and mix them by means of a line mixer.

If the HIPE which contains the polymerization initiator has a small difference between the emulsifying temperature and the polymerizing temperature thereof, the closeness of the emulsifying temperature to the polymerizing temperature will possibly set the polymerizing monomer or the cross-linking monomer polymerizing during the course of the emulsification and suffer the resultant polymer to impair the stability of the produced HIPE. Thus, the method of adding the reducing agent or the oxidizing agent or other polymerization initiator to the HIPE immediately prior to the polymerization, i.e. the method of ② or ③ mentioned above, proves advantageous.

The amount of the polymerization initiator to be used herein equals that in the method of ① described above under the title of the method for preparation of HIPE.

(2) Polymerization of HIPE (a) Method of polymerization

The HIPE is polymerized after it has undergone impartation of an expected form. This polymerization is generally effected by the method of standing polymerization under conditions which are incapable of breaking the structure of water drops highly dispersed in the oil phase of the HIPE. In this case, the HIPE may be subjected to the batch polymerization which consists in polymerizing one batch after another of the HIPE or to the continuous polymerization which consists in continuously feeding the HIPE and meanwhile casting and polymerizing the supplied HIPE.

For the purpose of harnessing to better advantage the effect of the quick aftercuring which characterizes this invention, the continuous polymerization which is capable of supplying the step of aftercuring with the porous cross-linked polymer material already heated by polymerization is adopted more favorably as the method of polymerization than the batch polymerization. For example, it is commendable to adopt the method of continuous polymerization which comprises continuously casting the HIPE onto a belt in motion and polymerizing the cast layer of the HIPE on the belt. In the case of using this method of continuous polymerization, in consideration of the behavior of the HIPE which is liable to induce deflection and separation in the vertical direction of the oil phase and the liquid phase of the homogenized texture of the HIPE and is comparatively brittle, it is commendable to form a porous cross-linked polymer material in the form of a sheet or a film by horizontally conveying an HIPE in the form of a sheet or a film and meantime polymerizing the HIPE so conveyed. Even in this case, the HIPE may be polymerized in the form of a block (or sheet) and then processed in an arbitrary finished form as by cutting the block or the sheet into sheets having a thickness of 5 mm each.

The term "continuous method" as used in the present specification refers to the case of continuously supplying the HIPE to a device for imparting a form and then continuously causing the supplied HIPE to cure and the term "batch method" to the case of imparting a prescribed form to the HIPE, collecting the formed pieces of the HIPE into groups of a proper number, and then causing the groups of formed pieces to be polymerized and cured in a polymerization vessel.

The method of continuously polymerizing the HIPE proves advantageous because it enjoys high efficiency of production and utilizes the reduction of the polymerization time and the miniaturization of the apparatus for polymerization most effectively. As a concrete method for continuous polymerization of a porous cross-linked polymer in the form of a sheet, the method which consists in continuously supplying an HIPE onto a belt conveyor in motion which is so constructed as to have the surface thereof heated with a heating device, shaping the HIPE on the belt in the form of a flat smooth sheet, and aftercuring the sheet of the HIPE may be cited. When the surface of the conveyor which is held in contact with the emulsion is flat and smooth, a continuous sheet of a prescribed thickness can be obtained by supplying the HIPE in a polymerized state and in a prescribed thickness onto the belt.

The production of a porous cross-linked polymer in a three-dimensional form may be implemented by the method of cast polymerization, i.e. by the steps of casting the HIPE in a mold of the prescribed form and causing the HIPE in the mold to polymerize and aftercure. Incidentally, the cast polymerization may be performed by a batch method or by a continuous method which requires the mold to be continuously advanced.

(b) Polymerization temperature

The polymerization temperature of the HIPE of this invention generally is in the range of normal room temperature −150° C. From the viewpoint of the stability of the HIPE and the polymerization velocity, this temperature is properly in the range of 60–120° C., preferably 75–120° C., and particularly preferably 85–110° C. If the polymerization temperature is less than the normal room temperature, the shortage will possibly be at a disadvantage commercially in requiring an unduly long time for the polymerization. Conversely, if the polymerization temperature exceeds 150° C., the excess will be possibly at a disadvantage in causing the produced porous cross-linked polymer material to form pores not uniform in diameter and suffer a decline of strength. The polymerization temperature may be changed in two steps or in more steps during the course of the polymerization. The present invention does not exclude this mode of implementing the polymerization.

(c) Polymerization time

The term "polymerization time" as used herein refers to the time which elapses till the bromine value of the water-in-oil emulsion falls to not more than 25%, preferably in the range of 25–10%, more preferably in the range of 15–10% of the value existing prior to the polymerization. This invention does not impose any particular limit on this time. The polymerization time of the HIPE in this invention, however, is properly within one hour, preferably within 30 minutes, particularly preferably in the range of 1–20 minutes, and especially preferably 1–10 minutes. If the polymerization time exceeds one hour, the excess will be possibly at a disadvantage commercially in impairing productivity. Conversely, if it is less than one minute, the shortage will be possibly at a disadvantage in preventing the porous cross-linked polymer material from acquiring sufficient strength. Naturally, the adoption of a longer time for curing by polymerization than the range mentioned above is not excluded by this invention.

(d) Apparatus for polymerization

The polymerization apparatus which can be used in this invention does not need to be particularly limited but may be properly selected from among the conventionally known chemical apparatuses which are suitably used for polymerization, if necessary, with proper modification. For the batch polymerization, for example, a polymerization vessel so shaped as to fit the purpose for which the product is to be used may be used. Then, for the continuous olymerization, a belt conveyor which is laid horizontally or a continuous polymerization device which is adapted to permit a series of molds required for casting to be advanced in concatenation may be used. The polymerization apparatus is additionally provided with a heating means or a control means which is suitable for polymerization. For example, a heating means which is capable of quickly elevating the polymerization temperature to the curing temperature by the use of active thermal energy rays such as microwaves and near infrared rays which can utilize the radiation energy or the thermal media such as hot water and hot air can be adopted, though not exclusively. A measure taken to keep the surface of the HIPE cast into the polymerization vessel in the case of the batch polymerization or the surfaces (both the upper and lower surfaces) of the HIPE formed on the drive conveyor such as a conveyor in the case of the continuous polymerization from exposure to the ambient air (specifically, the oxygen contained in the air) is effective in smoothing the advance of the polymerization and imparting open cells to the surface region. It is, therefore, commendable to keep the HIPE surface covered with an inert gas or a film or a sheet. The materials used for the polymerization apparatus do not need to be particularly discriminated. The apparatus may be made of a metal such as, for example, aluminum, iron, or stainless steel (inclusive of alloy), synthetic resin such as polyethylene, polypropylene, fluorine resin, polyvinyl chloride, or unsaturated polyester resin, or fiber-reinforced resin (FRP) having such a synthetic resin reinforced with glass fibers or carbon fibers.

(3) Aftercuring of Porous Cross-linked Polymer Material (a) Timing for aftercuring As concerns the timing for the aftercuring contemplated by this invention, the porous cross-linked polymer material is aftercured after the polymerization of the porous cross-linked polymer material has been continued till the bromine value thereof falls to not more than 25% of the value existing prior to the polymerization. The aftercuring is preferred to be performed continuously from the polymerization without interrupting the process because this continuity of the process minimizes the possible loss of energy. It is preferable to perform the aftercuring after the polymerization of the porous cross-linked polymer material has been continued till the bromine value thereof falls to not more than 25%, preferably in the range of 25–10%, more preferably in the range of 15–10% of the value existing prior to the polymerization. If the aftercuring is initiated after the decrease of the bromine value has surpassed 25% of the level of interest, the excess of the fall of the bromine value will be at a disadvantage in possibly breaking the porous texture of the HIPE and varying the pore diameters and consequently preventing the produced porous cross-linked polymer material from acquiring a fully satisfactory quality.

When the polymerization of the HIPE is continued by heating the HIPE till the bromine value thereof falls to 25% of the level existing prior to the polymerization, the aftercuring may be initiated after adding a polymerization initiator to the porous cross-linked polymer material. Preferably, the addition of the polymerization initiator in this case is implemented, for example, by a method of showering the porous cross-linked polymer material with an aqueous solution containing a water-soluble polymerization initiator or a method of immersing the porous cross-linked polymer material in an aqueous solution containing a water-soluble polymerization initiator.

(b) Method for aftercuring

This invention does not perform the treatment for the polymerization of the polymerizing monomer and the subsequent treatment for the aftercuring under identical conditions. By particularly performing the treatment for the aftercuring with a higher energy than the treatment of the polymerization, the cross-linking agent is enabled to polymerize in a very short period of time and, moreover, the produced porous cross-linked polymer material is enabled to retain outstanding properties. The aftercuring contemplated by this invention, therefore, can be carried out at a temperature higher than the temperature of an active energy ray or the polymerization temperature.

As concrete examples of the active energy ray, the far infrared ray (the electromagnetic waves 20 $\mu$m–1 mm in wavelength in the range of infrared rays extending from the red end of the visible ray through the millimeter microwaves) and the near infrared ray (the electromagnetic waves 0.75 $\mu$m–20 $\mu$m in wavelength in the range of infrared rays extending from the red end of the visible ray through the millimeter microwaves) which can utilize the radiation energy (the thermal action of heightening the temperature of a given substance which occurs when the infrared ray injected from an external source into the substance induces electromagnetic resonance with the atoms of the substance and attains effective absorption therein), the microwaves (the electromagnetic waves 1 meter–several millimeters in wavelength and 300–some hundred thousand megahertzs in frequency) which can utilize the high frequency induction heating (the phenomenon of an insulator to generate heat through induction loss in a high frequency electric field (several megahertzs–several gigahertzs) and enjoy the advantage of being heated from the interior of the insulator), the electron beam, and the ultraviolet light may be cited. The method for irradiating the porous cross-linked polymer material with the active energy ray does not need to be particularly discriminated. For the purpose of harnessing to better advantage the effect of quick aftercuring which characterizes this invention, however, it is commendable to expose to the active energy ray the porous cross-linked polymer material which is retained at the polymerization temperature continuously from the step of polymerization. Particularly from the viewpoint of shortening the aftercuring time, it is commendable to use the near infrared ray which features high transmittance, small thermal loss, and high energy efficiency, permits use of a simple apparatus, and suits the production by the conveyor operation (continuous aftercuring).

The aftercuring to be implemented at a temperature higher than the polymerization can be carried out by the use of the same apparatus as the polymerization apparatus described above in (d) under (2). For the purpose of harnessing to better advantage the effect of quick aftercuring which characterizes this invention, the HIPE which has undergone the step of polymerization to be aftercured continuously from the step of polymerization by being heated to a higher temperature than in the step of polymerization. Generally, the aftercuring temperature is in the range of 60–170° C. From the viewpoint of the aftercuring time, this temperature is properly in the range of 80–160° C., preferably 95–160° C., and particularly preferably 110–150° C. If the aftercuring temperature is less than 60° C., the shortage will possibly be at a disadvantage commercially in unduly elongate the time for the aftercuring. Conversely, if this temperature exceeds 160° C., the excess will be at a disadvantage in unduly elongating the time for elevating the temperature of the polymer to the level fit for the aftercuring. The aftercuring temperature may be varied in two stages or in more stages during the course of the aftercuring. The present invention does not exclude this mode of implementing the aftercuring. When a porous cross-linked polymer material having a high water content is aftercured at a temperature higher than 100° C., optionally a pressure higher than the atmospheric pressure may be applied to the porous cross-linked polymer material by the use of such a device as an autoclave, for example.

The aftercuring may be carried out after the polymerized porous cross-linked polymer material has been dehydrated. For this purpose, the active energy ray irradiation device 501 illustrated in FIG. 1 is disposed at a stage subsequently to the step of dehydrating treatment using the dehydrating roll 301. To be specific, the porous cross-linked polymer material which results from the polymerization of a polymerizing monomer (namely "the polymerization stage" which has been described above) completed through the step of polymerization and the subsequent step is generally deprived of the water as by compression or aspiration under a reduced pressure. The dehydration possibly decreases the thermal capacity of the porous cross-linked polymer material or varies the degree of transmission of the active energy ray through this material. As a result, the aftercuring can be performed with enhanced efficiency. Further, the dehydration may concurrently serve as a drying step for expelling the residual water. Since the dehydration results in inducing disappearance of the polymerization initiator from the water phase, the polymerization initiator to be incorporated in the HIPE when the aftercuring is performed subsequently to the dehydration is preferred to be an oil-soluble initiator. The step of aftercuring, therefore, is preferred to be implemented continuously from the step of polymerization or subsequently to the step of dehydration. In this mode of operation, the active energy ray irradiation device 501 illustrated in FIG. 1 is disposed at a stage subsequently to the step of the dehydrating treatment by the use of the dehydrating roll 301.

Incidentally, the aftercuring does not need to be limited to such a continuous mode as illustrated in FIG.1. For example, discrete pieces of porous cross-linked polymer material which have undergone polymerization of the batch mode may be subjected separately to an aftercuring treatment.

(c) Aftercuring time

The aftercuring time of the HIPE in this invention is such that the total of the polymerization time and the aftercuring time may fall in the range of within one hour. The aftercuring time is properly in the range of 10 seconds 30 minutes, preferably 10 seconds–10 minutes, and particularly preferably 10 seconds–five minutes. If the aftercuring time exceeds one hour, the excess will be possibly at a disadvantage commercially in impairing productivity. Conversely, if it is less than 10 seconds, the shortage will be possibly at a disadvantage in preventing the porous cross-linked polymer material from acquiring fully satisfactory strength. For the aftercuring, it suffices to select properly the method and the time mentioned above and put them to use in combination. When the method and the time are so selected that the bromine value of the porous cross-linked polymer material may be lowered by the aftercuring to not more than 10, they prove advantageous in respect that they bring a conspicuous improvement in the quality of the product.

Subsequently to the aftercuring, the porous cross-linked polymer material is cooled, optionally gradually, to the prescribed temperature, though not compulsorily particularly. Otherwise, the porous cross-linked polymer material which has undergone the polymerization may be transferred to the step of such an after treatment as the dehydration or the compression which will be specifically described herein below without being cooled meanwhile.

(4) Step of After Treatment (conversion into finished product) Subsequent to Formation of Porous Cross-linked Polymer Material (a) Dehydration The porous cross-linked polymer material which is formed in consequence of the completion of the polymerization is generally dehydrated by compression, aspiration under a reduced pressure, or the combination thereof. Generally, by the dehydration performed as described above, 50–98% of the water used is expelled and the remainder is left adhering to the porous cross-linked polymer material. Optionally, the dehydration may be effected prior to the aftercuring as mentioned above.

The ratio of dehydration is properly set to suit the purpose for which the porous cross-linked polymer material is used. Usually, the porous cross-linked polymer material in a perfectly dry state has a water content in the range of 1–10 g, preferably 1–5 g, per g of the polymer material.

(b) Compression

The porous cross-linked polymer of this invention can be obtained in a form compressed to one of several divisions of the original thickness. The compressed sheet has a smaller inner volume than the original porous cross-linked polymer and permits a decrease in the cost of transportation or storage. The porous cross-linked polymer in the compressed state is characterized by being disposed to absorb water when exposed to a large volume of water and resume the original thickness and exhibiting the ability to absorb water at a higher speed than the original polymer.

(c) Cleaning

For the purpose of improving the surface condition of the porous cross-linked polymer, the porous cross-linked polymer may be washed with pure water, an aqueous solution containing an arbitrary additive, or a solvent.

(d) Drying

The porous cross-linked polymer obtained by the preceding steps, when necessary, may be dried by heating as with hot air or microwaves or may be moistened for adjustment of the water content.

(e) Cutting

The porous cross-linked polymer obtained by the preceding steps, when necessary, may be cut in expected shape and size and fabricated into a finished product fitting the purpose of use.

(f) Impregnation

The polymer may be endowed with functionality by being impregnated with a detergent or an aromatic agent.

EXAMPLE

Now, this invention will be described more specifically below with reference to working examples. The properties of porous cross-linked polymer material reported in the working examples were determined and evaluated as follows.

Bromine Value

Reagents is prepared and standardized as follows to determine the bromine value of a given porous cross-linked polymer material.

(1) Preparation of PSDB solution: A solution obtained by placing 4±0.05 g of pyridine in 10 ml of glacial acetic acid and cooling them with ice and a solution obtained by placing 5±0.05 g of concentrated sulfuric acid in 10 ml of glacial acetic acid and cooling them with ice are mixed. The mixed solution and a solution obtained by placing 3.75±0.05 g of bromine in 10 ml of glacial acetic acid and cooling them with ice are put together and diluted with glacial acetic acid to a total volume of 500 ml. The reagent consequently formed is placed in a brown vial and stored in a cold dark place.

(2) Preparation of aqueous 2.5% mercuric nitrate solution: This aqueous solution is obtained by diluting 2.5 g of mercuric nitrate with glacial acetic acid to a total volume of 500 ml. This solution ought to be used within one week of being thus prepared.

(3) Aqueous 30% potassium iodide solution: This aqueous solution is obtained by diluting 300 g of potassium iodide with water to a total volume of 1000 ml and is put to storage in a cold dark place.

(4) Aqueous 1% starch solution: This aqueous solution is obtained by diluting 1 g of starch (soluble grade) with water to a total volume of 100 ml.

(5) N/10 sodium thiosulfate standard solution: This solution is obtained by diluting 25.0 g of sodium thiosulfate (anhydrous grade) and 0.01 g of sodium carbonate (anhydrous grade) together with water to a total volume of 1000 ml.

(6) Evaluation of N/10 sodium thiosulfate standard solution: The amount, 1.0–1.5 g, of potassium iodate (standard reagent, Mw=214.01) dried in advance at 120° C.–140° C. is accurately weighed out and dissolved in 250 ml of water. The portion, 25 ml, of the resultant solution is placed in a flask provided with a ground-in stopper and, after adding 2 g of potassium iodide and 5 ml of (1+5) sulfuric acid, immediately sealed in the flask by setting the stopper in place, gently shaken, and left standing in a dark place for five minutes, and then titrated with the N/10 sodium thiosulfate standard solution (indicator: aqueous starch solution, which is added to the solution after the solution assumes a slightly yellow color). The numerical value of f is calculated in accordance with the formula 1.

Formula 1:$f=[6\times(\text{weight of potassium iodate (g)}/214.01)\times(1000/100)\times25]/[\text{amount of titration (ml)}/0.1]$ (7) Procedure for determination of bromine value:

(i) About 1 g of a given porous cross-linked polymer material is swelled and dehydrated with purified water twice. Then, the cleaned material is placed in a plastic vessel having an inner volume of 1 liter and cleaned therein by being stirred with 500 ml of purified water for one hour. The cured substance is separated from the resultant material by filtration (Whatman, GF/F, 47 mmφ).

(ii) The porous cross-linked polymer material cleaned with the purified water is washed with acetone three times in the same manner as described above. Since the third washing affords a finely divided cured substance, it is preferred to be stirred with the final liquid. The double bond to be targeted by the determination of bromine value by the washing with acetone is destined to form not a residual polymerizing monomer but a cross-linking agent contained in the porous cross-linked polymer material.

(iii) The porous cross-linked polymer material separated by filtration is dried under a reduced pressure at 65° C. for three hours by the use of a vacuum drying device (made by Tabai and sold under the trademark designation of "Vacuum Oven LHV-122").

(iv) In an iodine vial having an inner volume of 500 ml, the volume, 25 ml, of the PSDB solution is placed with a whole pipet and cooled to 0–10° C. with an ice bath.

(v) The amount, about 0.1 g, of the cleaned, vacuum dried porous cross-linked polymer material is accurately weighed out (W g) and added to the iodine vial. Then, 25 ml of the aqueous 2.5% mercuric acetate solution is quickly added to the vial with a measuring cylinder and the contents of the vial are sealed by setting the stopper in place, shaken, then dipped inan ice bath at 0–10° C., and retained therein accurately for 15 minutes (during the addition with the aid of the measuring cylinder, the ground parts of the stopper are thoroughly wetted).

(vi) The iodine vial is withdrawn from the dark place, made tomount 25 ml of theaqueous 30% potassium iodide solution on the liquid receiving part thereof, dipped in the ice bath as far as the ground parts and, as held intact, made to loose the stopper, and lightly rotated to induce gradual descent of the contents. The vial is again sealed by setting the stopper in place, shaken for about 15 seconds to stir the contents, and made to add 100 ml of water with a measuring cylinder while giving a wash to the ground parts.

(vii) Immediately after the washing, the iodine vial is titrated with the N/10 sodium thiosulfate standard solution. When the solution assumes a yellow color, it is made to add 1% starch indicator and continue titration till the color starch iodine disappears (A ml).

(viii) Separately as a blank test, the titration is performed by repeating the same procedure as described above without adding any sample (B ml).

(8) Method for calculation of bromine value:

The bromine value (g/100 g) is calculated in accordance with the formula 2.

Formula 2:Bromine value=(B−A)×f×0.799/W (9) Determination of bromine value of oil phase:

The initial bromine value, namely the bromine value of the oil phase prior to the polymerization, is determined by the same method as described above by using about 0.1 g of the oil phase (the mixture of a monomer with an emulsifier) as the material for determination instead of the washed and vacuum dried porous cross-linked polymer material.

Ratio of Free Swelling

A sample cut in the cube of 1 cm was dried and weighed and immersed in an ample amount of purified water. The sample swelled by absorbing the purified water was left standing and draining for 30 seconds on a glass filter 120 mm in diameter and 5 mm in thickness (made by Duran Corp. and sold under the product code of "#0"). The sample now wet with the absorbed water was weighed. The ratio of free swelling (g/g) of the porous cross-linked polymer material was calculated in accordance with the formula 3 shown below using the weight found as above.

Formula 3:Ratio of free swelling=(Mass of sample after absorbing water−Weight of sample before absorbing water)/(Mass of sample before absorbing water)

Resistance to Compression Strain

A sample was cut to obtain a disc 5 mm in thickness and 2.87 cm in diameter. The disc was immersed in a physiological saline solution at 32° C. The disc in the immersed state was tested for thickness under no load by the use of a dead-load thickness meter (made by Ono Sokkiseizo K.K. and sold under the trademark designation of "Digital Linear Gauge Model EG-225"). After the elapse of 15 minutes then, the sample was held under a load of 5.1 kPa. When the mass of the sample reached the state of equilibrium, the thickness of the sample under the load was measured. The resistance to compression strain (RTCD) (%) was calculated in accordancewith the formula 4 shown below.

Formula 4:RTCD (%)=[(Thickness under no load−Thickness under load)/(Thickness under no load)]×100

Example of Preparation of HIPE of High Water Content

A water phase to be used in the continuous emulsifying process for the formation of an HIPE having a high water content was prepared by dissolving 36.3 kg of anhydrous calcium chloride and 568 g of potassium persulfate in 378 liters of purified water. Then, an oil phase was obtained by adding 960 g of diglycerin monooleate to a mixture consisting of 1600 g of styrene, 4800 g of 2-ethylhexyl acrylate, and 1600 g of 55% divinyl benzene. The water phase was supplied at a temperature of 75° C. and a flow volume of 56.5 cm$^3$/s and the oil phase at a temperature of 22° C. and a flow volume of 1.13 g/s respectively to a dynamic mixing device, and they were thoroughly mixed in the dynamic mixing device by means of a pin impeller rotating at 1800 rpm, with part of the resultant mixture put to recirculation, to obtain an HIPE having a high water content and showing a bromine value of 120 in the oil phase at a velocity of 57.6 cm$^3$/s.

Comparative Example 1

The HIPE of high water content obtained in the example of preparation of an HIPE of high water content was cast into the gap between opposed PET films mounted in an apparatus constructed as illustrated in FIG. 1, adjusted to a thickness of 5 mm, then moved on a plat plate, passed at a speed of 20 cm/min through a polymerization furnace set in advance at an internal temperature of 85° C. to obtain a porous cross-linked polymer material having a bromine value of 15. The produced porous cross-linked polymer material was found to have a ratio of free inflation of 47 g/g and as high a RTCD as 35%. Thus, the product showed a large strain under load and an inferior quality under load.

Comparative Example 2

The amount, 500 g, of the HIPE of a high water content obtained in the example of preparation of an HIPE of high water content was cast into a Plastic container having an inner volume of 1 liter, polymerized by being immersed for 20 minutes in a water bath set in advance to 85° C. as swept with nitrogen to obtain a porous cross-linked polymer material having a bromine value of 15. The produced porous cross-linked polymer material was found to have a ratio of free inflation of 47 g/g and as high a RTCD as 35%. Thus, the product showed a large strain under load and an inferior quality under load.

Comparative Example 3

The porous cross-linked polymer material of a bromine value of 15 obtained in Comparative Example 1 was passed at a speed of 10 cm/min through the same polymerization furnace as used in Comparative Example 1 and having an inner temperature set in advance at 85° C. to be aftercured therein for 40 minutes at the same temperature as in the polymerization to obtain a porous cross-linked polymer material having a brine value of 13. The produced porous cross-linked polymer material was found to have a ratio of free inflation of 47 g/g and as high a RTCD as 25%. Thus, the product showed a large strain under load and an inferior quality under load.

Comparative Example 4

The HIPE of high water content having a bromine value of 120 obtained in Comparative Example 1 was cast into the gap between opposed PET films mounted in an apparatus constructed as illustrated in FIG. 1, adjusted to a thickness of 5 mm, then moved on a plat plate, passed at a speed of 20 cm/min through a polymerization furnace set in advance at an internal temperature of 75° C. to obtain a porous cross-linked polymer material having a bromine value of 35. When the produced porous cross-linked polymer material having the bromine value of 35 was irradiated with a microwave for one minute, the water phase boiled to an extent of breaking the porous cross-linking polymer material. Thus, the porous cross-linked polymer material could not acquire a homogeneous texture.

Example 1

The porous cross-linked polymer material of a bromine value of 15 obtained in Comparative Example 1 was irradiated with amicrowave for oneminute to obtain a porous cross-linked polymer material having a bromine value of 8 and a high cross-link density. The produced porous cross-linked polymer material was found to have a ratio of free inflation of 47 g/g and a low RTCD of 8%. Thus, the product showed only small strain under load and excelled in quality under load.

Example 2

The porous cross-linked polymer material of a bromine value of 15 obtained in Comparative Example 1 was irradiated with a far infrared ray for three minutes to obtain a porous cross-linked polymer material having a bromine value of 7 and a high cross-link density. The produced porous cross-linked polymer material was found to have a ratio of free inflation of 47 g/g anda low RTCD of 7%. Thus, the product showed only small strain under load and excelled in quality under load.

Example 3

The porous cross-linked polymer material of a bromine value of 15 obtained in Comparative Example 1 was irradiated with a near infrared ray for three minutes to obtain a porous cross-linked polymer material having a bromine value of 6 and a high cross-link density. The produced porous cross-linked polymer material was found to have a ratio of free inflation of 47 g/g and a low RTCD of 7%. Thus, theproduct showed only small strain under load and excelled in quality under load.

Example 4

The porous cross-linked polymer material of a bromine value of 15 obtained in Comparative Example 1 was irradiated with an ultraviolet ray emitted from a UV irradiation device made by Iwasaki Denki K.K. (a metal halide lamp) for three minutes to obtain a porous cross-linked polymer material having a bromine value of 10 and a high cross-link density. The produced porous cross-linked polymer material was found to have a ratio of free inflation of 47 g/g and a low RTCD of 9%. Thus, the product showed only small strain under load and excelled in quality under load.

Example 5

The porous cross-linked polymer material of a bromine value of 15 obtained in Comparative Example 1 was irradiated on each side ten times with an electron beam of 10 Mrad emitted from an EB irradiation device made by Nisshin High-Voltage K.K. (acceleration voltage 300 kv) to obtain a porous cross-linked polymer material having a bromine value of 10 and a high cross-link density. The produced porous cross-linked polymer material was found to have a ratio of free inflationof 47 g/g and a low RTCD of 9%. Thus, theproduct showed only small strain under load and excelled in quality under load.

Example 6

The porous cross-linked polymer material of a bromine value of 15 obtained in Comparative Example 1 was dipped in an aqueous 0.1% KPS solution and then irradiated with a near infrared ray for three minutes to obtain a porous cross-linked polymer material having a bromine value of 5 and a high cross-link density. The produced porous cross-linked polymer material was found to have a ratio of free inflation of 47 g/g and a low RTCD of 6%. Thus, the product showed only small strain under load and excelled in quality under load.

Example 7

The porous cross-linked polymer material of a bromine value of 15 obtained in Comparative Example 2 was placed in an autoclave and heated therein at 120° C. for 10 minutes to obtain a porous cross-linked polymer material having a bromine value of 8 and a high cross-link density. The produced porous cross-linked polymer material was found to have a ratio of free inflation of 47 g/g and a low RTCD of 8%. Thus, the product showed only small strain under load and excelled in quality under load.

Example 8

The porous cross-linked polymer material of a bromine value of 15 obtained in Comparative Example 2 was placed in an autoclave and heated therein at 150° C. for five minutes to obtain a porous cross-linked polymer material having a bromine value of 7 and a high cross-link density. The produced porous cross-linked polymer material was found to have a ratio of free inflation of 47 g/g and a low RTCD of 7%. Thus, the product showed only small strain under load and excelled in quality under load.

Example 9

The porous cross-linked polymer material of a bromine value of 15 obtained in Comparative Example 2 was dipped in an aqueous 0.1% KPS solution and then placed in an autoclave and heated therein at 150° C. for five minutes to obtain a porous cross-linked polymer material having a bromine value of 5 and a high cross-link density. The produced porous cross-linked polymer material was found to have a ratio of free inflation of 47 g/g and a low RTCD of 6%. Thus, the product showed only small strain under load and excelled in quality under load.

Example 10

A porous cross-linked polymer material having a bromine value of 13 was obtained by following the procedure of Comparative Example 1 while having 100 g of t-butylperoxy-2-ethyl hexanoate added in advance as an oil-soluble initiator to the oil phase. This porous cross-linked polymer material was irradiated with a near infrared ray for three minutes to obtain a porous cross-linked polymer material having a bromine value of 5 and a high cross-link density. The produced porous cross-linked polymer material was found to have a ratio of free inflation of 47 g/g and a low RTCD of 6%. Thus, the product showed only small strain and excelled in quality under load.

Example 11

The porous cross-linked polymer material having a bromine value of 13 and obtained in Example 10 was dehydrated by compression till the water content was adjusted to 5 g per g of the polymer and the dehydrated material was irradiated with a near infrared ray for two minutes to obtain a porous cross-linked polymer material having a bromine value of 4 and a high cross-link density. The produced porous cross-linked polymer was found to have a ratio of free inflation of 47 g/g and a low RTCD of 5%. Thus, the product showed only small strain and excelled in quality under load.

Example 12

The porous cross-linked polymer material having a bromine value of 13 and obtained in Example 10 was dehydrated by compression till the water content was adjusted to 5 g per g of the polymer and the dehydrated material was heated at 125° C. for 1.5 minutes to obtain a porous cross-linked polymer material having a bromine value of 8 and a high cross-link density. The produced cross-linked polymer was found to have a ratio of free inflation of 47 g/g and a low RTCD of 7%. Thus, the product showed only small strain and excelled in quality under load.

Example 13

The porous cross-linked polymer material having a bromine value of 13 and obtained in Example 10 was dehydrated by compression till the water content was adjusted to 5 g per g of the polymer and the dehydrated material was irradiated on each side five times with an electron beam of 10 Mrad emitted from an EB irradiation device made by Nisshin High-Voltage K.K. (acceleration voltage 300 kv) to obtain a porous cross-linked polymer material having a bromine value of 9 and a high cross-link density. It was found to have a RTCD of 8%.

Example 14

The HIPE of a high water content obtained in the example of preparation of an HIPE of high water content was polymerized at 95° C. for five minutes by the use of the apparatus described in Comparative Example 1 to obtain a porous cross-linked polymer material having a bromine value of 14. When part of the porous cross-linked polymer material obtained at this stage was taken and tested for quality, it was found to have a ratio of free inflation of 47 g/g and a RTCD of 20%. When the material was continuously cured at 120° C. for two minutes till the bromine value fell to 8, the RTCD was improved to 8%.

Example 15

A porous cross-linked polymer material having a bromine value of 13 was obtained by following the procedure of Example 14 while having 100 g of t-butylperoxy-2-ethyl hexanoate added in advance as an oil-soluble initiator to the oil phase. When part of the porous cross-linked polymer material at this stage was taken and tested for quality, it was found to have a ratio of free inflation of 47 g/g and a RTCD of 19%. The porous cross-linked polymer material obtained by dehydrating the material mentioned above by compression till the water content was adjusted to 4 g/g was irradiated on each side five times with an electron ray of 10 Mrad emitted from an EB irratiation device made by Nisshin High-Voltage K.K. (acceleration voltage 300 kv) to obtain a porous cross-linked polymer material having a high cross-link density. This porous cross-linked polymer material was found to have a bromine value of 7 and a RTCD of 6%.

INDUSTRIAL APPLICABILITY

The porous cross-linked polymer obtained by the HIPE method excels in such properties as density, water absorbing property, water retaining property, heat insulating property, and sound insulating property. This invention, by aftercuring a porous cross-linked polymer material which is in process of polymerization, produces a porous cross-linked polymer material excelling in absorption properties and mechanical strength in a very short period of time with high efficiency.

What is claimed is:

1. In the production of a porous cross-linked polymer material by the polymerization of a water-in-oil emulsion, a method for the production of a porous cross-linked polymer material, comprising a step of polymerizing said water-in-oil emulsion till the bromine value thereof falls to not more than 25% of the value existing prior to said polymerization and a subsequent step of aftercuring the produced porous cross-linked polymer material by virtue of an active energy ray or a temperature higher than the polymerization temperature.

2. A method according to claim 1, wherein said polymerization and said aftercuring are continuously carried out.

3. A method according to claim 1, wherein said water-in-oil emulsion is polymerized by heating till the bromine value thereof falls to not more than 25% of the bromine value of said water-in-oil emulsion existing prior to said heating and then the produced porous cross-linked polymer material is treated, after adding a polymerization initiator, with an active energy ray or a heat of a temperature higher than the polymerization temperature.

4. A method according to claim 1, wherein said porous cross-linked polymer material is produced from said water-in-oil emulsion by the use of not less than two different kinds of polymerization initiator.

5. A method according to claim 1, wherein said water-in-oil emulsion is continuously supplied onto a conveyor, shaped thereon in the form of a sheet, and polymerized till the bromine value thereof falls to not more than 25% of the value existing prior to the polymerization and the produced porous cross-linked polymer material is aftercured with an active energy ray or a temperature higher than the polymerization temperature.

6. A method according to claim 3, wherein the surface of said conveyor exposed to said water-in-oil emulsion is a flat smooth sheet.

7. A method according to claim 5, wherein the surface of said conveyor exposed to said water-in-oil emulsion is possessed of a mold and said water-in-oil emulsion is shaped by being supplied to said mold.

8. A method according to claim 1, wherein said water-in-oil emulsion is supplied into said mold and polymerized therein till the bromine value of said emulsion falls to not more than 25% of the value existing prior to said polymerization and the produced porous cross-linked polymer material is aftercured by an active energy ray or a temperature higher than the polymerization temperature.

9. A method according to claim 1, wherein said water-in-oil is polymerized till the bromine value thereof falls to not more than 25% of the value existing prior to the polymerization, at least part of the water phase contained in the consequently obtained porous cross-linked polymer material is dehydrated, and then the porous cross-linked polymer material is aftercured by means of an active energy ray or a temperature higher than the polymerization temperature.

10. A method according to claim 9, wherein said water-in-oil emulsion contains an oil-soluble initiator.

* * * * *